United States Patent
Lahtinen

(10) Patent No.: US 6,169,900 B1
(45) Date of Patent: Jan. 2, 2001

(54) REVERSE INTER-MSC HANDOVER

(75) Inventor: Lauri Lahtinen, Espoo (FI)

(73) Assignee: Nokia Telecommunications OY, Espoo (FI)

( * ) Notice: Under 35 U.S.C. 154(b), the term of this patent shall be extended for 0 days.

(21) Appl. No.: 09/091,949

(22) PCT Filed: Dec. 17, 1996

(86) PCT No.: PCT/FI96/00667

§ 371 Date: Jun. 26, 1998

§ 102(e) Date: Jun. 26, 1998

(87) PCT Pub. No.: WO97/24897

PCT Pub. Date: Jul. 10, 1997

(30) Foreign Application Priority Data

Dec. 29, 1995 (FI) ........................................ 956356

(51) Int. Cl.$^7$ .................................................. H04Q 7/20
(52) U.S. Cl. ...................... 455/439; 455/560; 455/436; 455/445
(58) Field of Search ..................... 455/426, 436, 455/438, 439, 456, 457, 560, 432, 442, 437, 445

(56) References Cited

U.S. PATENT DOCUMENTS

| | | | |
|---|---|---|---|
| 5,487,065 | * 1/1996 | Acampora et al. | 370/332 |
| 5,649,290 | * 7/1997 | Wang | 370/332 |
| 5,659,596 | * 8/1997 | Dunn | 455/456 |
| 5,737,703 | * 4/1998 | Byrne | 455/442 |
| 5,884,173 | * 3/1999 | Sollner | 455/436 |
| 5,896,373 | * 4/1999 | Mitts et al. | 370/331 |
| 5,930,712 | * 7/1999 | Byrne et al. | 455/437 |

FOREIGN PATENT DOCUMENTS

WO 94/28689  12/1994 (WO).

OTHER PUBLICATIONS

Mouly, et al., *The GSM System for Mobile Communications*, pp. 311–312, 378, 412–415, 425, 442–444, 1992.

* cited by examiner

*Primary Examiner*—Lee Nguyen
*Assistant Examiner*—Congvan Tran
(74) *Attorney, Agent, or Firm*—Altera Law Group, LLC

(57) ABSTRACT

The GSM system includes a protocol for reestablishing a lost call. A problem occurs if the call is lost after an inter-MSC (MSC-A, MSC-B) handover, resulting in that the system does not know into which MSC the subscriber data of a mobile station (MS) has been updated. If the MSC has changed during the call, and the MS is no longer able to contact the cell served by the original MSC-A, the call will be lost. In the method according to the invention, the MSC serving the location area of the mobile station detects a start message (1') transmitted by the mobile station and containing the Last Location Area Identifier of the mobile station. Based on the Last Location Area Identifier, the second center MSC-B, which detects the start message (1'), determines the first center MSC-A in whose area the call was started. Following this, the second center MSC-B may establish a connection to the first center MSC-A. At this stage, the centers (MSC-A) and MSC-B) reverse roles and the method proceeds as in a conventional inter-MSC handover. The method of the invention for establishing a connection may also be applied to a satellite system that uses the GSM system network structure.

7 Claims, 3 Drawing Sheets

REVERSE INTER-MSC HANDOVER

BACKGROUND OF THE INVENTION

1. Field of the Invention

The present invention relates to mobile communication systems and particularly call reestablishment after call loss, as well as call establishment in satellite communication systems.

2. Description of the Related Art

FIG. 1 shows those parts of a cellular mobile communication system that are essential as far as the invention is concerned. Mobile Stations (MS) communicate with Base Transceiver Stations (BTSn) serving radio cells Cn. The base stations are coupled to Mobile Switching Centers (MSC) through Base Station Controllers (BSC). A subsystem under control of a BSC (the subsystem including base stations BTSn controlled by the BSC, and other elements of the mobile communication network that are not shown) is referred to as a Base Station Subsystem (BSS) The interface between the MSC and the BSS is referred to as an A interface.

The mobile switching center MSC handles the connecting of incoming and outgoing calls. It performs functions similar to those of an exchange of a public switched telephone network (PSTN) . In addition to these, it also performs functions characteristic of mobile communications only, such as subscriber location management, jointly with the subscriber registers of the network. As subscriber registers, the GSM system at least includes a home location register HLR and a visitor location register VLR, not shown in FIG. 1.

The GSM system is a system of the time division multiple access (TDMA) type, in which time-division communication takes place on the radio path in successive TDMA frames, each of which consists of several time slots. In each time slot, a short information packet is sent as a radio frequency burst which has a finite duration and which consists of a set of modulated bits. Apart from the traffic channels transferring speech and data, the GSM system also uses control channels on which signalling between the base station and mobile subscriber stations is carried out.

Inter-MSC call traffic is transferred e.g. via the public switched telephone network (PSTN). In addition, signalling information is conveyed between the MSCs by using a so-called MAP connection (Mobile Application Part). The MAP protocol is specified in the ETSI GSM standard 09.02.

When the mobile station MS moves from one radio cell Cn to another, a handover (HO) is carried out in the system. It is possible to distinguish between handovers of many different types depending on which elements of the mobile communication system participate in the handover. Within the area of one BSC, the term used is Inter-BTS handover. Within the area of one MSC, the term used is Intra-MSC or Inter-BSC handover. When a mobile station moves from the area of a first mobile switching center MSC-A to the area of a second mobile switching center MSC-B. the term used is Inter-MSC handover. The MSC in whose area the call was started is referred to as an Anchor MSC.

FIG. 2 shows signalling messages associated with a handover between the first center MSC-A and the second center MSC-B. It should, however, be noted that also other messages than those described are transmitted in a handover situation, but for reasons of clarity they are not shown here. 1: an MS transmits measurement results (Meas_Report) of the neighbouring cells to the serving base station system BSS-A. 2: the BSS-A determines the need for a handover to a cell in a new base station system BSS-B on the basis of e.g. radio path criteria. 3: the BSS-A transmits a handover request Handover_Required to the serving MSC-A. 4: the MSC-A transmits a handover request Prep_Handover_Req to the new MSC-B. 5: the MSC-B transmits a Handover_ Request to the BSS-B, or more specifically to its BSC, in which the new BSS-B is requested to provide the service requested. 6: if there are resources available, the BSS-B transmits a Handover_Request_Acknowledge message to the MSC-B. 7: the MSC-B transmits an acknowledgement message Prep_Handover_Resp to the serving center MSC-A. 8: the MSC-A transmits a Handover_Command to the serving BSS-A. 9: the BSS-A transmits a Handover_ Command message to the MS. 10: the MS is now able to begin communicating in a new cell in the BSS-B. 11: the MS transmits an acknowledgement Handover_Complete to the BSS-B. 12: the BSS-B transmits a similar acknowledgement Handover_Complete to the MSC-B. 13: the MSC-B transmits, to the center MSC-A, an acknowledgement message Send_End_Signal_Req on the basis of which the MSC-A knows that the MS has switched over to the new base station system in the MSC-B. 14–15: finally, the resources allocated to the call in the old base station system BSS-A are released.

While roaming within the area of a mobile communication network, a mobile station MS may lose its connection to the base station BTS serving it. For situations of this kind, a so-called Call Re-establishment procedure has been defined in the GSM system. A description of such a procedure is offered e.g. in Mouly-Pautet "the GSM System for Mobile Communications", ISBN 2-950719-0-7, pp. 412–415. The re-establishment according to the GSM system is twofold. The first part closely resembles random access procedure, with the mobile station having the leading role. The second part is controlled by the mobile communication network which restores the higher level connections of the network hierarchy.

A problem is encountered when a call is lost after an inter-MSC handover. Let us assume that a call is started in a cell served by the mobile switching center MSC-A, and that a mobile station MS has roamed to the area under MSC-B during the call. A prior art mobile communication system is only able to carry out call re-establishment via the cell served by the original center MSC-A. If the mobile switching center has changed during the call and the MS is no longer able to contact the cell served by the original center MSC-A, the call will be lost. The subscribers find it annoying to have to start the call anew. It is especially inconvenient for the call to be lost during a data connection as computers, unlike people, are incapable of smoothly continuing from the point at which the call was lost. For example, a salesman transmitting an order to a sales office does not know whether the computer managed to book the order or not in case of call loss. The risk ensues that the same order is booked twice or that is not booked at all. Also, long data transfers, such as telefax transmissions, must in such a case usually be started afresh.

An analog drawback is evident in such satellite-based mobile communication systems which use a network structure based on the GSM system. Geosynchronous satellites orbit the earth, staying permanently at the same location in relation to the earth. Problems related to such geosynchronous satellites include high transmitting power requirements, resulting from the great distance, and long propagation delays. As far as satellites having a lower orbit are concerned, one of the problems encountered is that the network hierarchy may change even in the middle of a call due to satellites corresponding to base stations orbiting the earth. A problem resembling the connection loss described above is met in such a satellite system already at the connection set-up stage. In the satellite system, the problem results from the "base stations" changing position. Signalling used by a mobile communication system built on earth can therefore not be applied as such to satellite systems. The difference can be seen e.g. in that upon paging a mobile station, the Page_Response message may be returned from an area of a different MSC than the one to which the Page call was sent. However, it will below be shown that the solution according to the invention of the problem caused by the connection loss can be applied to establishing a connection in a satellite system.

SUMMARY OF THE INVENTION

It is therefore an object of the invention to develop a method by means of which the aforementioned problems resulting from the moving of the mobile station and/or base station (i.e. satellite) can be solved. In the case of the GSM system, this entails a method for re-establishing a lost call in case a mobile station has during the call roamed from a first MSC area to a second MSC area. In the case of a satellite system this entails set-up of a mobile-terminating or mobile-originating connection. Here, "connection" may equally well refer to an ordinary call, a short message or a supplementary service.

The objects of the invention are achieved by a method which is characterized by that which is set forth in the independent claims. The preferred embodiments are disclosed in the dependent claims.

The invention is based on the mobile switching center which serves the mobile station detecting a start message transmitted by the mobile station, such a message in the case of the exemplary GSM system being a Re-establishment Request. The start message includes a Last Location Area Identifier (Last_LAI) of the MS. On the basis of the last location area identifier, the second center MSC-B, which detects the start message, determines the first center MSC-A in whose area the call was started. Following this, the second center MSC-B may set up a connection to the first center MSC-A. At this stage, the two centers MSC-A and MSC-B reverse roles, and the method proceeds as in the case of a conventional inter-MSC handover.

The method according to the invention provides the advantage that a larger portion of interrupted calls may be resumed without the above problems associated with call loss. The invention further provides a simple method by means of which signalling of a conventional mobile communication system, such as the GSM system, may be applied to satellite systems.

BRIEF DESCRIPTION OF THE DRAWING

In the following, the invention will be described by means of its preferred embodiments, with reference to the attached drawings, in which.

DETAILED DESCRIPTION OF THE INVENTION

Figure 1:
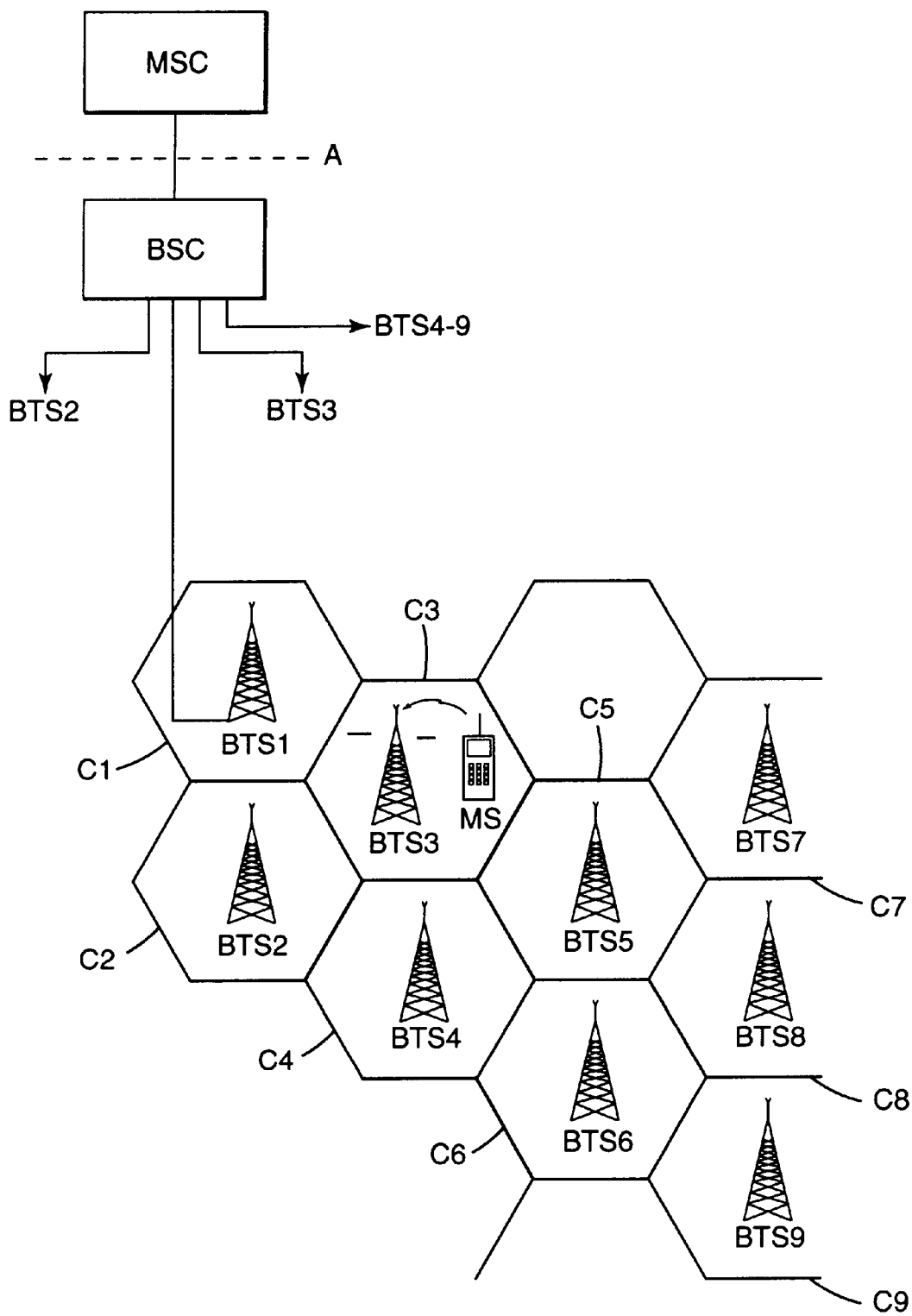
FIG. 1 shows, from the point of view of the present invention, the essential parts of a conventional cellular mobile communication system.
Figure 2:
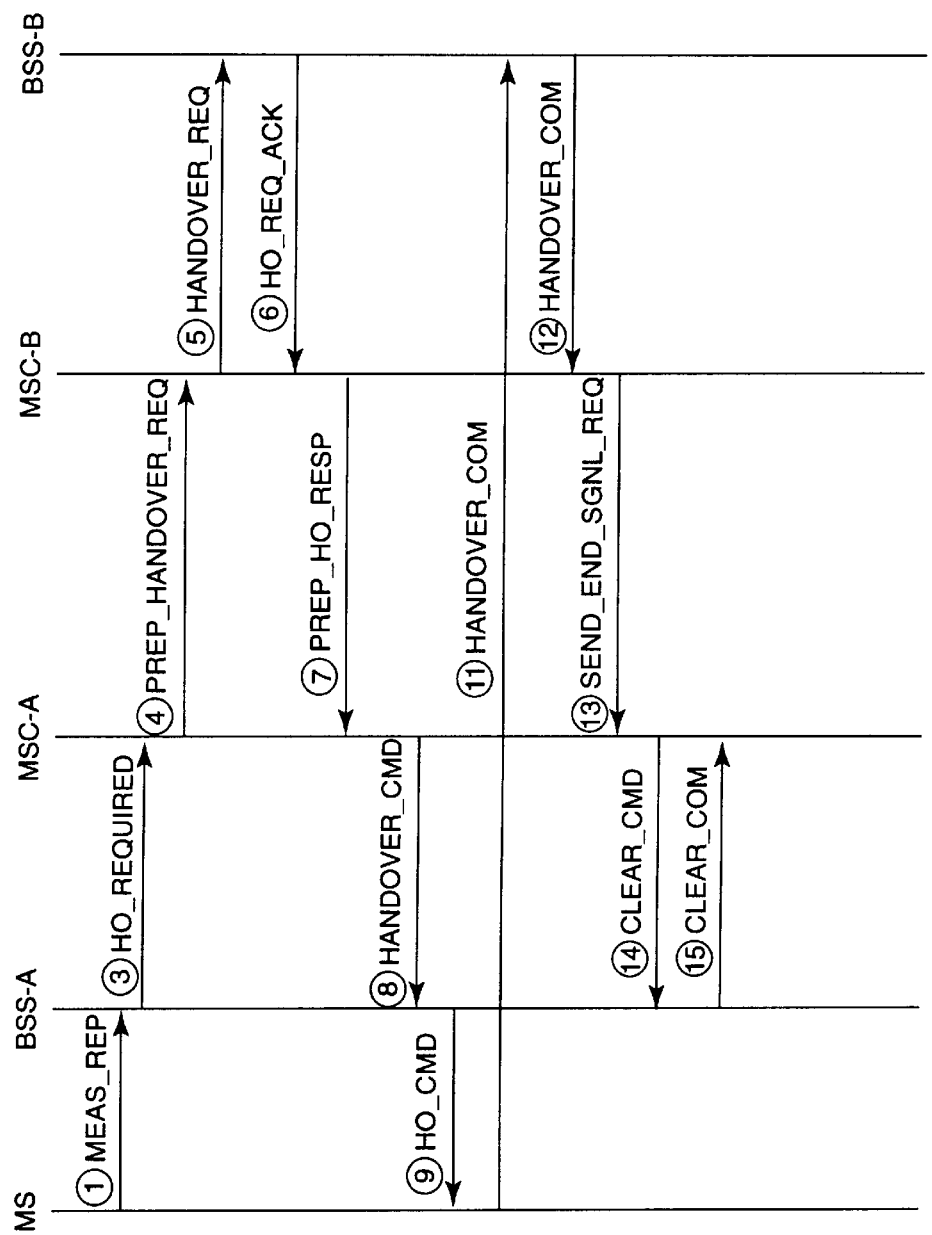
FIG. 2 shows messages used in the prior art inter-MSC handover.
Figure 3:
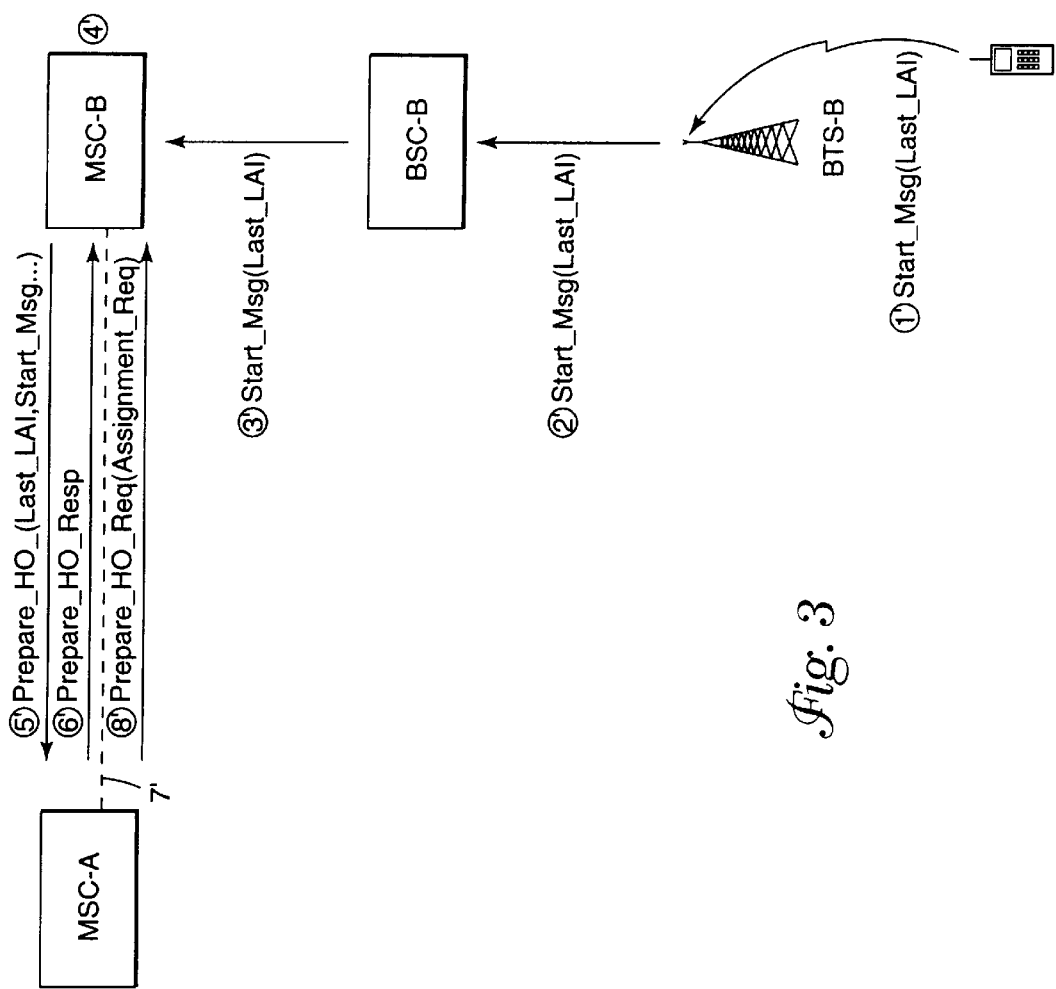
FIG. 3 shows the messages used in association with call re-establishment according to the invention.

Referring to FIG. 3, a case will be discussed in which a mobile station MS has started a call in the area of the first center, MSC-A, and during the call roamed to the area of the second center, MSC-B. (The steps associated with FIG. 3 are provided with apostrophes to distinguish them from the steps associated with FIG. 2). If the connection is lost, the MS transmits and the base station BTS-B detects, at step 1', a start message, which in association with the exemplary GSM system may be a Re-establishment Request. At step 2' the start message is forwarded to the base station controller BSC-B and at step 3' to the MSC-B. The start message contains the Last Location Area Identifier (Last_LAI) of the mobile station and an MS identifier which may be either an IMSI (International Mobile Subscriber Identity) or a TMSI (Temporary Mobile Subscriber Identity). At step 4' the MSC-B learns on the basis of the Last_LAI that the LAI in question does not belong to the MSC-B area and establishes a connection to the center (MSC-A) to whose area the Last_LAI belongs. At step 5' the MSC-B transmits, to the MSC-A, a Prepare handover Message which has as its parameter the start message transmitted by the mobile station. At step 6', the MSC-A transmits an acknowledgement message Prepare_Handover_Ack to the MSC-B.

As shown by the above, steps 4'–6' resemble preparation of a normal inter-MSC handover discussed in connection with FIG. 2, but with the second center MSC-B initiating the handover and at first operating as the anchor MSC.

At step 7', the centers MSC-A and MSC-B reverse roles so that the MSC-B operates as the anchor MSC from that moment on. At step 8', the MSC-A transmits a Prepare_Handover message to the MSC-B, after which the operation continues from step 5 as in the conventional inter-MSC handover discussed above.

The MAP protocol between the MSCs does not have to be modified as it can even presently be used to transfer any A-interface messages between the MSCs. The functionality of the MSCs must be supplemented so that they detect the above situations related to steps 4'–6'. In this case the message indicates other functionality than a handover and the MSCs must therefore be able to link the incoming handover request to some existing transaction at the MSC or to link it to the user information in the VLR. If, for example, it is the MSC-A that manages to do this, it transmits an acknowledgement message Prepare_Handover_Ack to the MSC-B. After that, the MSC-A is in control of the signalling protocols, and if the connection requires traffic channels, their allocation is started from the MSC-A.

The method according to the invention for establishing a connection may also be applied in such a satellite system which uses the GSM system network structure, whereby the base stations BTS of FIG. 2 would correspond to satellites, which are not shown. In the case of a mobile-terminating connection (such as a call, short message or supplementary service) the system does not know in which satellite's area the mobile station should be paged, and so the mobile station will be paged in the areas of all the satellites. When the mobile station responds to the paging, it may send a similar message as the one described in association with FIG. 3. In consequence, the system is able to restrict the connection to the satellite in whose area the mobile station responds to the paging. Correspondingly, at the beginning of a mobile-originating call, the MS may signal its location to the system in the manner described above.

The invention has been described by way of example in connection with the GSM system or a satellite system based on the GSM system. It is obvious for a person skilled in the art that the invention is applicable to other mobile communication systems as well. This means that, regarding the call set-up message and messages controlling the handover, the messages used in the system in question must be employed.

The invention and its embodiments are therefore not restricted to the examples above but they may vary within the scope of the claims.

What is claimed is:

1. A method for establishing or re-establishing a call between a mobile station (MS) and a mobile communication system comprising at least a first mobile switching centre (MSC-A) and a second mobile switching centre (MSC-B), wherein:

subscriber information relating to the mobile station (MS) is stored in the first mobile switching centre (MSC-A);

a call can be routed via an anchor centre holding information relating to the call;

a call can be handed over from the anchor centre to another centre; and the mobile station (MS) transmits a start message (1');

the method being characterized by the steps of:

receiving the start message (1') at the second MSC;

detecting, on the basis of the start message, that the subscriber information relating to the mobile station (MS) is stored in the first MSC;

initiating handover from the second MSC to the first MSC, and using, initially, the second MSC as the anchor MSC; and reversing the functions of the first MSC and the second MSC so that after the reverse the first MSC functions as the anchor centre.

2. A method as claimed in claim 1, characterized in that the start message (1') comprises an identifier (Last-LAI) identifying the last location area of the mobile station.

3. A method as claimed in claim 2, characterized in that:

the method is used for re-establishing a call which has been initited in the area of the first MSC (MSC-A) and which has been lost in the area of the second centre (MSC-B);

the start message (1') is a Reestablishment-Request requesting reestablishment of the lost call; and the subscriber information relating to the mobile station (MS) is detected to be stored in the first MSC (MSC-A), on the basis of the identifier Last-LAI) identifying the last location area of the mobile station (MS).

4. A method as claimed in claim 1, characterized in that:

the method is used for establishing a mobile terminating call in a satellite communication system;

the start message (1') transmitted by the mobile station is preceded by paging of the mobile station (MS), initiated by the first centre (MSC-A); and the mobile station (MS) responds to the paging by sending said start message (1').

5. A method as claimed in claim 1, characterized in that the method is used for establishing a call originated by mobile station (MS) in a satellite communication system.

6. A method as claimed in claim 2, characterized in that:

the method is used for establishing a mobile terminating call in a satellite communication system;

the start message (1') transmitted by the mobile station is preceded by paging of the mobile station (MS), initiated by the first centre (MSC-A); and the mobile station (MS) responds to the paging by sending said start message (1').

7. A method as claimed in claim 2, characterized in that the method is used for establishing a call originated by mobile station (MS) in a satellite communication system.

* * * * *